United States Patent
Haprian et al.

(10) Patent No.: US 10,853,137 B2
(45) Date of Patent: Dec. 1, 2020

(54) EFFICIENT RESOURCE ALLOCATION FOR CONCURRENT GRAPH WORKLOADS

(71) Applicant: Oracle International Corporation, Redwood Shores, CA (US)

(72) Inventors: Vlad Ioan Haprian, Zürich (CH); Iraklis Psaroudakis, Zürich (CH); Alexander Weld, Mountain View, CA (US); Oskar Van Rest, Mountain View, CA (US); Sungpack Hong, Palo Alto, CA (US); Hassan Chafi, San Mateo, CA (US)

(73) Assignee: Oracle International Corporation, Redwood Shores, CA (US)

( * ) Notice: Subject to any disclaimer, the term of this patent is extended or adjusted under 35 U.S.C. 154(b) by 68 days.

(21) Appl. No.: 16/351,377

(22) Filed: Mar. 12, 2019

(65) Prior Publication Data

US 2020/0293372 A1    Sep. 17, 2020

(51) Int. Cl.
*G06F 9/46*    (2006.01)
*G06F 9/50*    (2006.01)
(Continued)

(52) U.S. Cl.
CPC .......... *G06F 9/5005* (2013.01); *G06F 9/3822* (2013.01); *G06F 11/3006* (2013.01); *G06F 16/9024* (2019.01); *G06K 9/628* (2013.01)

(58) Field of Classification Search
CPC .............. G06F 9/5005; G06F 11/3006; G06F 16/9024; G06F 9/3822; G06K 9/628
See application file for complete search history.

(56) References Cited

U.S. PATENT DOCUMENTS

| | | | |
|---|---|---|---|
| 8,856,797 B1 * | 10/2014 | Siddiqui | G06F 9/46 718/104 |
| 9,329,899 B2 | 5/2016 | Ailamaki et al. | |

(Continued)

FOREIGN PATENT DOCUMENTS

WO    WO2017/052539 A1    3/2017

OTHER PUBLICATIONS

Psaroudakis et al., "Adaptive NUMAaware data placement and task scheduling for analytical workloads in main-memory column-stores", Proceedings of the VLDB Endowment 10 (2), dated 2016, 12 pages.

(Continued)

*Primary Examiner* — Adam Lee
(74) *Attorney, Agent, or Firm* — Hickman Palermo Becker Bingham LLP

(57) ABSTRACT

Techniques are described herein for allocating and rebalancing computing resources for executing graph workloads in manner that increases system throughput. According to one embodiment, a method includes receiving a request to execute a graph processing workload on a dataset, identifying a plurality of graph operators that constitute the graph processing workload, and determining whether execution of each graph operator is processor intensive or memory intensive. The method also includes assigning a task weight for each graph operator of the plurality of graph operators, and performing, based on the assigned task weights, a first allocation of computing resources to execute the plurality of graph operators. Further, the method includes causing, according to the first allocation, execution of the plurality of graph operators by the computing resources, and monitoring computing resource usage of graph operators executed by the computing resources according to the first allocation. In addition, the method includes performing, responsive to (Continued)

| Operator | Condition | Tag |
|---|---|---|
| Root Vertex Match | $|I| * |M| > (\lambda\_1)$ | Memory Intensive |
|  | Otherwise | CPU Intensive |
| Neighbor Match | $|W| > (\lambda\_2)$ | Memory Intensive |
|  | Otherwise | CPU Intensive |
| Common Neighbor Match | Always | CPU Intensive |
| Edge Match | Always | Memory Intensive |
| Cartesian Product | Always | Memory Intensive |
| Reachability Match | Always | Memory Intensive |
| Group By | Always | CPU Intensive |
| Order By | Always | CPU Intensive |
| ... | ... | ... | monitoring computing resource usage, a second allocation of computing resources to execute the plurality of graph operators, and causing, according to the second allocation instead of according to the first allocation, execution of the plurality of graph operators by the computing resources.

20 Claims, 6 Drawing Sheets

(51) Int. Cl.
*G06F 9/38* (2018.01)
*G06F 11/30* (2006.01)
*G06K 9/62* (2006.01)
*G06F 16/901* (2019.01)

(56) References Cited

U.S. PATENT DOCUMENTS

| | | | |
|---|---|---|---|
| 9,983,903 B2 | 5/2018 | Ailamaki et al. | |
| 10,162,678 B1* | 12/2018 | Stafford | G06F 9/5016 |
| 2014/0032761 A1* | 1/2014 | Beveridge | G06F 9/45533 709/226 |
| 2017/0017674 A1 | 1/2017 | Scheuer et al. | |
| 2017/0168779 A1 | 6/2017 | Sevenich et al. | |
| 2018/0077228 A1* | 3/2018 | Blagodurov | H04L 67/1008 |
| 2018/0246755 A1 | 8/2018 | Ailamali et al. | |
| 2020/0084019 A1* | 3/2020 | Xu | H04L 9/3297 |

OTHER PUBLICATIONS

Ailamaki et al., "How to Stop Under-Utilization and Love Multicores", Proceedings of the 2014 ACM Sigmod International Conference on Management of Data, dated 2014, 4 pages.
Bartolini et al., "Automated Fine-Grained CPU Provisioning for Virtual Machines", ACM, dated 2014, 25 pages.
English Abstract, "Eoniko Meteobio Noaytexneio", dated 2010, 154 pages.
Ghodsi et al., "Dominant Resource Fairness: Fair Allocation of Multiple Resource Types", dated 2011, 14 pages.
Goodman et al., "Pandia: comprehensive contention-sensitive thread placement", EuroSys '17, dated Apr. 23-26, 2017, Belgrade, Serbia, 16 pages.
Grunert, Jonas, "Concurrent Query Analytics on Distributed Graph Systems", Institute of Parallel and Distributed Systems, Master's Thesis, dated Jun. 1, 2017, 60 pages.
Harris et al., "Callisto-RTS: Fine-Grain Parallel Loops", 2015 USENIX Annual Technical Conference, dated Jul. 2015, 13 pages.
Harris, "Callisto: Co-Scheduling Parallel Runtime Systems", EuroSys '14, dated Apr. 13-16, 2014, Amsterdam, Netherlands, 15 pages.
Hauck et al., "Can Modern Graph Processing Engines Run Concurrent Queries Efficiently?", Grades'17, Chicago, IL, USA, dated 2017, 6 pages.
Heidari, Safiollah, "Cost-efficient Resource Provisioning for Largescale Graph Processing Systems in Cloud Computing Environments", dated May 2018, 248 pages.
Kim et al. "Parallel Processing of Multiple Graph Queries Using MapReduce", DBKDA 2013 : The Fifth International Conference on Advances in Databases, Knowledge, and Data Applications, dated 2013, 6pgs.
Namaki et al., "Performance Prediction for Graph Queries", NDA'17 dated May 19, 2017, Chicago, IL, USA, 9 pages.
Ailamaki et al. "Databases on Modern Hardware: How to Stop Underutilization and Love Multicores", Synthesis Lectures on Data Management 9 (1), 1-113, dated 2017, 1 page.
Psaroudakis et al. "Analytics with Smart Arrays: Adaptive and Efficient Language-Independent Data", EuroSys '18, fdated Apr. 23-26, 2018, Porto, Portugal, 15 pages.
Zhao, Jin, "Efficient Two-Level Scheduling for Concurrent Graph Processing", IEEE Transactions on Journal Name, Manuscript ID 1, dated Jun. 2018, 8 pages.
Psaroudakis et al., "Adaptive NUMAaware Data Placement and Task Scheduling for Mainmemory Column-store Scans and Aggregations", dated 2016, 12 pages.
Psaroudakis et al., "Dynamic Fine-Grained Scheduling for EnergyEfficient Main-Memory Queries", Proceedings of the 10th International Workshop on Data Management on New Hardware, dated 2014, 7 pages.
Psaroudakis et al., "Reactive and Proactive Sharing Across Concurrent Analytical Queries", Sigmod'14, dated Jun. 22-27, 2014, Snowbird, UT, USA, 4 pages.
Psaroudakis et al., "Scaling Up Concurrent Analytical Workloads on Multi-Core Servers", Thesis at EPFL, dated 2016, 179 pages.
Psaroudakis et al., "Scaling Up Concurrent MainMemory Column Store Scans:Towards Adaptive NUMAaware Data and Task Placement", Proceedings of the VLDB Endowment, vol. 8, No. 12, dated 2015, 12 pages.
Psaroudakis et al., "Scaling up Mixed Workloads: a Battle of Data Freshness, Flexibility, and Scheduling", Proceedings of the 6th TPC Technology Conference (TPCTC), dated 2014, 16 pages.
Psaroudakis et al., "Sharing Data and Work Across Concurrent Analytical Queries", Proceedings of the VLDB Endowment, vol. 6, No. 9, dated 2013, 12 pages.
Psaroudakis et al., "Task Scheduling for Highly Concurrent Analytical and Transactional MainMemory Workloads", 4th International Workshop on Accelerating Data Management Systems, dated 2013, 10 pgs.
Psaroudakis, Iraklis, "Sharing Data and Work Across Queries in Analytical Workloads", EDIC Research Proposal dated Jun. 13, 2012, 8 pages.
Wolf et al., "Extending Database Task Schedulers for Multithreaded Application Code", Proceedings of the 27th International Conference on Scientific and Statistical Database Management, 2015, 12pgs.
Xue et al., "Processing Concurrent Graph Analytics with Decoupled Computation Model", IEEE Transactions on Computers, vol. 66 , Issue: 5 , dated May 1, 2017, 15 pages.
Xue et al., "Seraph: an Efficient, Low-cost System for Concurrent Graph Processing", HPDC'14, dated Jun. 23-27, 2014, Vancouver, BC, Canada, 12 pages.
Zhang et al., "CGraph: A Correlations-aware Approach for Efficient Concurrent Iterative Graph Processing", Proceedings of the 2018 USENIX Annual Technical Conference, dated Jul. 2018, 13 pages.
Pan et al., "Congra: Towards Efficient Processing of Concurrent Graph Queries on Shared-Memory Machines", IEEE, dated 2017, 8 pages.

\* cited by examiner

FIG. 3

| Operator | Condition | Tag |
|---|---|---|
| Root Vertex Match | $|I| * |M| > (lambda\_1)$ | Memory Intensive |
| | Otherwise | CPU Intensive |
| Neighbor Match | $|W| > (lambda\_2)$ | Memory Intensive |
| | Otherwise | CPU Intensive |
| Common Neighbor Match | Always | CPU Intensive |
| Edge Match | Always | Memory Intensive |
| Cartesian Product | Always | Memory Intensive |
| Reachability Match | Always | Memory Intensive |
| Group By | Always | CPU Intensive |
| Order By | Always | CPU Intensive |
| ⋮ | ⋮ | ⋮ |

300

EFFICIENT RESOURCE ALLOCATION FOR CONCURRENT GRAPH WORKLOADS

FIELD OF THE DISCLOSURE

The present disclosure relates to allocating computing resources for executing graph workloads.

BACKGROUND

Graph analysis is an important type of data analytics where an underlying dataset is modeled by a graph representation that captures relationships between data in the dataset. Using graph processing systems to apply graph analysis procedures to exploit these relationships can provide valuable insight about the dataset. Graph processing systems may support execution of concurrent graph queries or workloads coming from one or more connected clients. However, sharing computing resources between clients and workloads can be particularly challenging in the context of graph analysis because workload characteristics may be very divergent. For example, different graph analysis tasks may have unique innate parallelism and dependency nature, some tasks might benefit from utilizing additional computing resources, while other tasks might be sequential in nature such that adding computing resources provides much less benefit. Moreover, the processing of graph analysis tasks can be characterized by different performance bottlenecks. For example, for tasks that are central processing unit (CPU) bound, the main performance bottleneck is one or more processor cores or threads of the CPU performing computations. For tasks that are memory bound, the main bottleneck is related to the physical memory access time.

One example approach for graph workload scheduling and execution is simply an equal split of CPU resources among concurrently executed workloads. Such an approach can decrease overall system throughput, however, because concurrent executing graph workloads are often bounded by resources of different types, such as CPU utilization or memory bandwidth. In one illustrative example, a CPU with sixteen hardware threads is utilized to execute two workloads W1, W2. Workload W1 is memory intensive and can saturate the memory bandwidth with six threads, while workload W2 is CPU intensive. In this example, the resource allocation approach splits the CPU threads equally, allocating eight threads to each workload. However, because workload W1 is bounded by saturated memory bandwidth with as few as six threads, the two additional threads allocated to workload W1 are not efficiently utilized. This results in suboptimal resource usage and decreases system throughput. To improve system throughput in such a case, the two additional threads allocated to workload W1 could be reallocated to workload W2.

Improvements are desired to facilitate concurrent execution of graph workloads in graph analysis systems so that computing resources are efficiently utilized to improve throughput.

BRIEF DESCRIPTION OF THE DRAWINGS

FIG. 3 is a table depicting operator classifications in terms of being memory intensive or CPU intensive according to an embodiment.

DETAILED DESCRIPTION

In the following description, for the purpose of explanation, numerous specific details are set forth in order to provide a thorough understanding of the present disclosure. It will be apparent, however, that the present disclosure may be practiced without these specific details.

GENERAL OVERVIEW

Techniques are provided to allocate computing resources used to execute concurrent graph processing workloads or tasks in an efficient manner. The disclosed dynamic resource allocation for graph loads help to assign computing resources that are needed and can be effectively utilized by graph processing tasks. As a result, the present dynamic resource allocation techniques help to ensure that computing resources are not wasted or underutilized by some tasks while other potential concurrently running tasks, which may be waiting for resources to become available, could advantageously utilize such resources. This boosts full system usage and overall query throughput. Further, in order to not exacerbate user-perceived latency of individual workloads, it may be useful to reallocate only the unnecessary or underutilized resources from one or more tasks to one or more other concurrently executing tasks.

Embodiments of the present disclosure include decomposing a task into a set of individual operators executed to perform the task. Example operators include Vertex Match, Neighbor Match, Edge Match, and the like. These operators are classified as CPU or memory intensive using a pre-defined set of input graphs via off-line profiling. Computing resources can then be assigned based on the set of operators and classifications as being CPU or memory intensive.

However, as the behavior of each operator is linked with the topology of the actual input graph, this off-line profiling and resource allocation can in practice generate misclassifications and inefficient use of resources. In order to address this issue, the disclosed dynamic resource allocation uses an on-line profiling phase that monitors resource usage during runtime. The on-line profiling phase may use hardware counters that output the resource usage of each individual operator being executed. Using data from the hardware counters, resource allocations can be adaptively readjusted to effectively correlate workload needs with changes in underlying graph structures or query/algorithm type.

Instead of not supporting concurrent graph processing implementations or providing a rudimentary, inefficient implementation of concurrent graph processing, the dynamic resource allocation, and off-line and on-line graph workload analyses as described herein may be utilized to distribute computing resources among graph processing tasks so that graph processing tasks may execute concurrently with improved efficiency and system throughput.

System Overview

Figure 1:
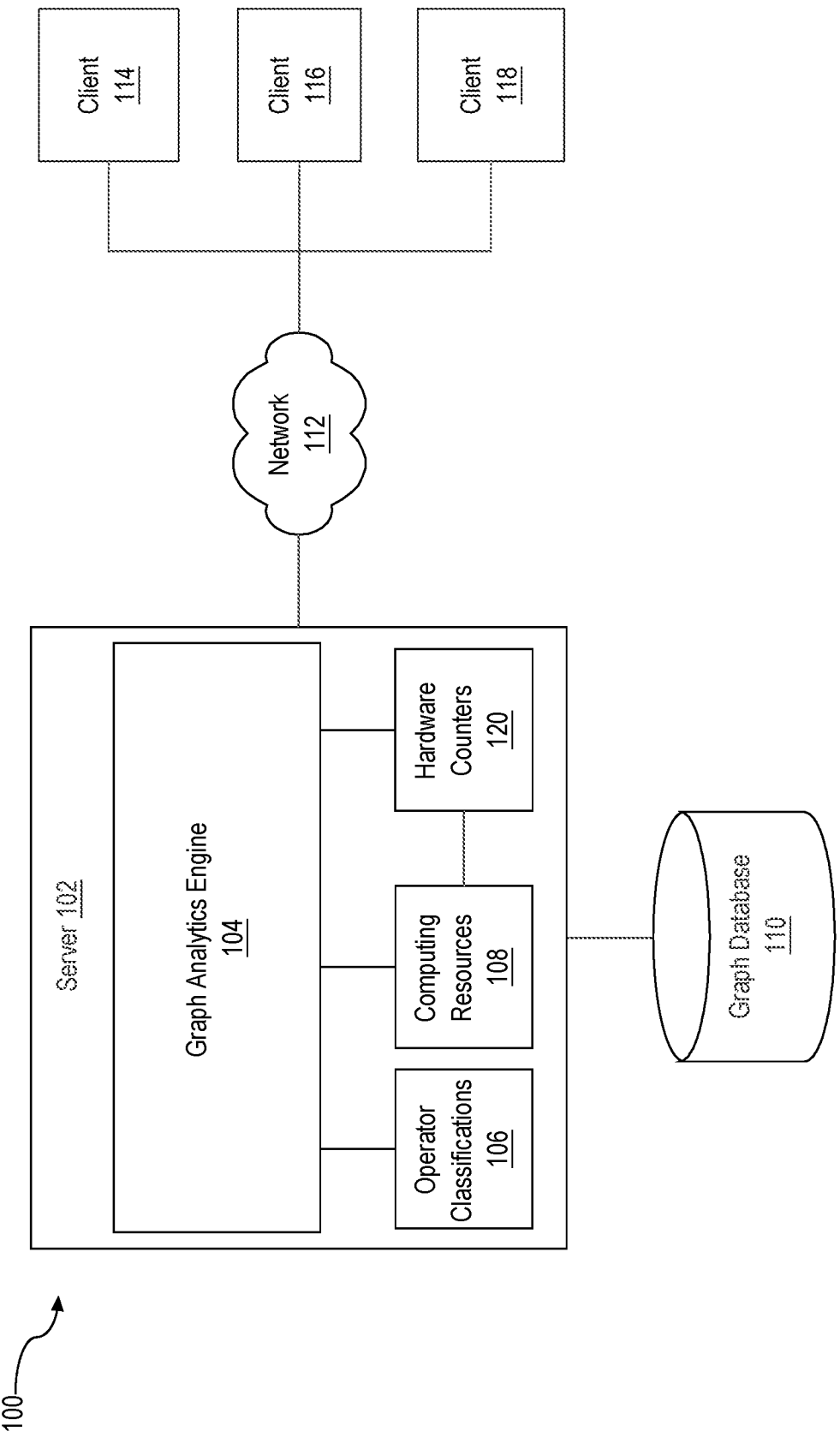
FIG. 1 illustrates an example system for allocating computing resources to execute one or more graph workloads or tasks.

FIG. 1 illustrates an example system for allocating computing resources to execute one or more graph processing workloads or tasks. In the illustrated embodiment, an example graph processing system 100 includes server 102, graph analytics engine 104, operator classifications 106, hardware and software computing resources 108, graph database 110, network 112, one or more clients 114, 116, 118, and hardware counters 120.

In the context of this example system 100, the one or more clients 114, 116, 118 are connected via the network 112 to the server 102, and the server 102 receives requests from the clients 114, 116, 118 to perform graph processing workloads, queries, or other tasks. Such tasks may include, for example, loading a graph into memory and performing graph analytic operations, such as returning information about a graph, adding nodes/vertices and edges to a graph, deleting nodes/vertices and edges from a graph, and updating properties or attributes of nodes/vertices/edges of a graph. The requests from the clients may conform to a standard or proprietary set of APIs, such as BluePrint API.

Clients 114, 116, 118 in FIG. 1 broadly represent any computing device that is separate from the server 102, such as a laptop computer, desktop computer, workstation, or other computer, and that is associated with a client or other end-user that connects with the server 102.

Network 112 may be implemented by any medium or mechanism that provides for the exchange of data between the various elements of FIG. 1. For purposes of illustrating a clear example, network 112 is shown as a single element but in practice, network 112 may comprise one or more local area networks, wide area networks, and/or internetworks. The various elements of FIG. 1 may also have direct (wired or wireless) communications links, depending upon a particular implementation.

For purposes of illustrating a clear example, FIG. 1 illustrates three clients 114, 116, 118, and single instances of certain other elements. Other embodiments may implement any number of clients or other elements. For example, the server 102 may be deployed as two or more computers, clusters, containers, and/or virtual machine instances in one or more physical or virtual machines that are co-located, separate, and/or located in shared computing facilities such as cloud computing datacenters.

The clients 114, 116, 118 may connect to the server 102 on a session level basis that uniquely identifies the client. Multiple sessions may be active concurrently. A session is a particular connection established for the client to the server through which the client issues a series of requests (e.g., requests for execution of graph processing tasks). The server 102 may maintain state data about the session. The session state data reflects the current state of the session and may contain the identity of the client for which the session is established, services used by the client, and other information. The current state of the session is all of the session state data associated with a port associated with the database session. Subsequent commands received over the port are assumed by the server 102 to be associated with all of the session state data associated with the port until such session is terminated. When the session is terminated, the session state data is deleted. When a new session is established on the port, the client determines new session state data to use for the new session and directs the server to load the new session state data for the new session.

Connections are mechanisms for enabling sessions. A connection may refer to either a physical mechanism, such as a physical port, or a logical connection mechanism, or both. Often, there is a one-to-one mapping of logical connections to physical connections; however, it is possible to have more than one logical connection associated with a single physical connection or more than one physical connection associated with a single logical connection.

The server 102 includes or is otherwise operatively coupled to the graph analytics engine 104. The graph analytics engine 104 translates client requests into graph operations that a storage device that stores graph database 110 recognizes or is configured to process. Further, the graph analytics engine 104 performs one or more graph analytic operations to analyze graph processing workloads and allocate or assign one or more computing resources 108 to execute the workloads.

The graph analytics engine 104 may be implemented in hardware, software, or any combination of hardware and software. For example, the graph analytics engine 104 may execute on one or more computing nodes, each comprising one or more processors and memory (such as random access memory (RAM)) that stores software instructions. The software instructions when executed cause the one or more processors to perform graph analytics operations, such as generating data in-memory or persistently, including generating results that are returned to clients. Even though FIG. 1 depicts a single element for a graph analytics engine 104, graph analytics engine may be implemented on a single computing device or on multiple computing devices.

Graph analytics engine 104 and/or server 102 may have access to storage device(s), which may include an allocated portion of memory in server 102, graph database 110, disk storage in an underlying database, or some other non-transitory storage.

In an embodiment, the graph analytics engine 104 is configured to decompose a graph workload into a set of one or more graph operators that are executed together in a series and/or in parallel on an associated graph dataset to thereby execute the overall graph workload. The graph dataset may be loaded from the graph database 110 and/or otherwise provided by a client, for example. Generally, a graph dataset is a representation of underlying data, in which data is represented as nodes or vertices, and edges that connect nodes represent relationships between the data. If graph database 110 stores multiple graphs, then each graph represents a different set of data that is to be treated separately for graph analysis purposes. For example, one graph set may reflect relationships among users in one social network while another graph set may reflect relationships among users in another social network. As another example, one graph set may reflect relationships among users in a social network while another graph set may reflect connections among computing devices in a network.

The graph analytics engine 104 utilizes data in the form of operator classifications 106 to assign runtime resource requirements to each graph operator. In one example, the runtime resource requirements are based on CPU utilization and memory bandwidth. The graph analytics engine 104 uses the assigned runtime resource requirements to allocate computing resources 108 to execute each operator. The computing resources 108 include computer system processes or machines that execute tasks assigned by the graph analytics engine 104. The term process is used herein to refer to a computer system process, as described in the following Software Overview section. The server 102 may include or otherwise be operatively coupled to the computing resources 108 via the network 112, for example. Further, different components of the computing resources 108 may execute tasks in parallel, communicate with each other in order to synchronize task execution, and/or complete graph processing operations. The computing resources 108 may also be responsible for managing localized data required to compute distributed graph analytics operations.

During runtime while the allocated computing resources 108 are executing the graph operators, the graph analytics engine 104 uses information from hardware counters 120 to analyze the actual, online resource usage and adjust the allocation of computing resources as needed or desired.

Off-Line Analysis

Figure 2:
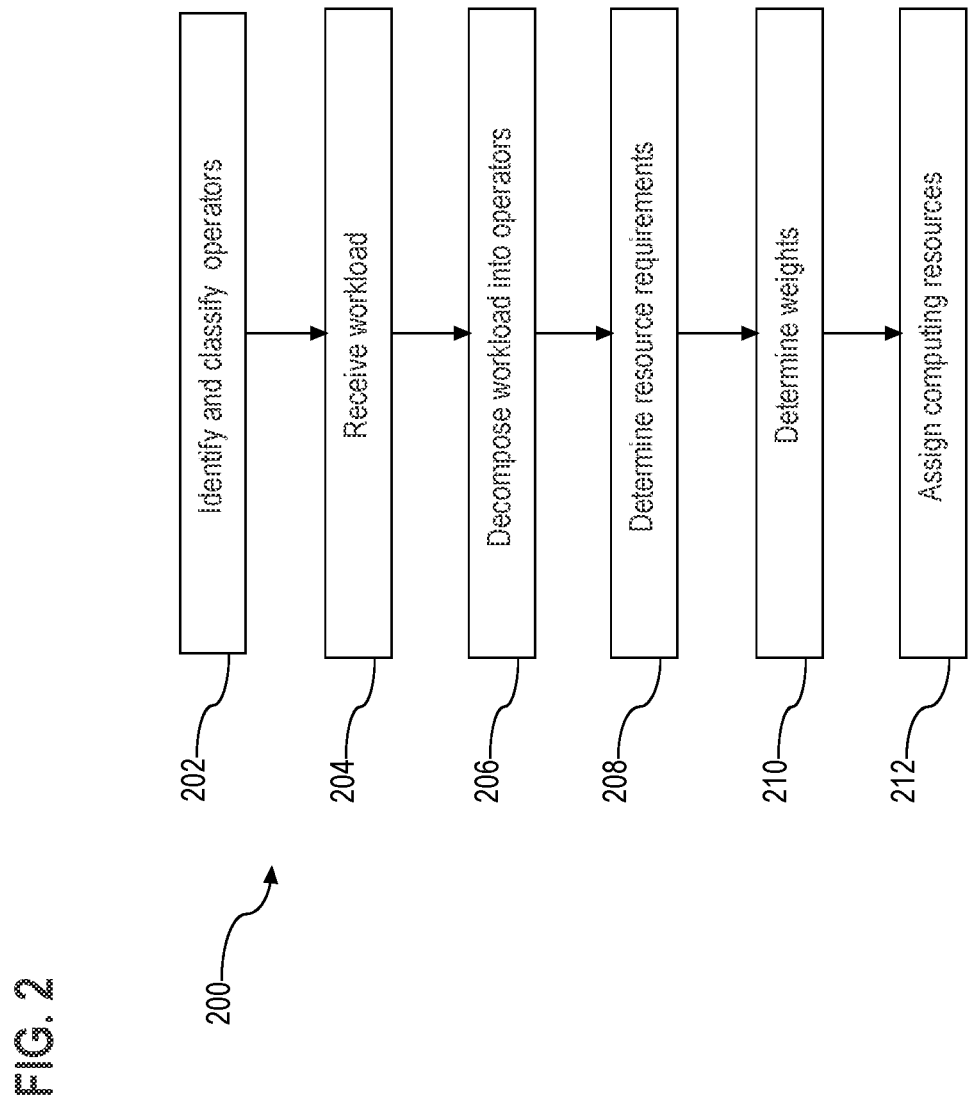
FIG. 2 is a flowchart depicting off-line graph workload analysis according to an embodiment.

FIG. 2 is a flowchart 200 depicting off-line graph workload analysis according to an embodiment. Generally, the graph workload analysis of flowchart 200 processes one or more graph processing workloads from one or more clients to identify constituent graph operators that may be performed concurrently, at least in part. The graph workload analysis determines resource requirements on the level of the graph operators. Based on the determined resource requirements, the graph workload analysis assigns or allocates computing resources to perform the operators.

At block 202, the system 100 identifies graph operators or functions that may be utilized to execute a graph workload and classifies the graph operators in terms of runtime resource requirements. In one embodiment, the graph analytics engine 104 identifies the operators and classifies the resources requirements of the operators as being memory intensive or CPU intensive during execution. A set of possible operators with which a variety of graph queries can be expressed, includes but is not limited to: Root Vertex Match, which matches all vertices satisfying a condition; Neighbor Match, which iterates over all neighbors of a vertex; Common Neighbor Match, which finds common neighbors of a given pair of vertices; Edge Match, which matches an edge satisfying a given condition; Cartesian Product, which creates the Cartesian product of match results; Reachability Match, which matches vertices connected via a given path pattern; Group By, which creates groups out of a match result; and Order By, which orders match results by a specific condition.

To classify the operators, the graph analytics engine 104 analyzes runtime resource requirements of each graph operator using a set of one or more predetermined graph datasets. The one or more predetermined graph datasets may include datasets of varying size, characteristics, and types. Examples of graph dataset types include parallel graphs, complete graphs, grid graphs, and variations thereof. Examples of graph dataset characteristics relate to the degree of interrelatedness between nodes, average path length between nodes, number of edges connected to nodes, network density, among others.

In an embodiment, for a given predetermined graph dataset, the graph analytics engine 104 measures instructions per cycle (IPC) for each possible operator performed on the given graph dataset. According to the present example, a high IPC value for an operator is greater than a threshold value, such as greater than one, and corresponds to the graph analytics engine 104 classifying the operator as being CPU intensive. A low IPC value for an operator is less than a threshold value, such as less than one, and corresponds to the graph analytics engine 104 classifying the operator as being memory intensive.

This classification of operators may also be dependent, in part, on result set estimators related to parameters of the operators being performed on a given test graph dataset. For instance, the result set estimators may include: |I|—number of input rows (estimated) of the graph operator; |W|—number of (arithmetic) operations in a filter clause of the graph operator; and |M|—number of memory accesses (e.g., graph/vertex property accesses) in the filter clause of the graph operator. FIG. 3 provides an example of how such result set estimators may be used to classify graph operators.

FIG. 3 is a table 300 depicting example operator classifications as being memory intensive or CPU intensive. The classifications or tags of each graph operator as being memory intensive or CPU intensive may be based on aggregated characteristics from multiple test datasets or may be based on unique characteristics of each of multiple test datasets. Accordingly, in some embodiments, there are different sets of operator classifications 106, 300 associated with different characteristics of underlying predetermined graph datasets used to generate such classifications. Generally, operator classifications may be represented by data structures such as tables, as shown in FIG. 3, or by a configuration file in any format, for example, the classifications could be written into a JSON file and read by the graph analytics engine at startup.

In the example classifications illustrated in FIG. 3, the Root Vertex Match operator may be tagged as memory intensive if $|I|*|M|>$(lambda_1), and otherwise tagged as CPU intensive. The Neighbor Match operator may be tagged as CPU intensive if $|W|>$(lambda_2), and otherwise tagged as CPU intensive. The lambda_1 and lambda_2 parameter values may be determined by profiling and measuring IPC for various test datasets. The example classifications in FIG. 3 further include the Common Neighbor Match operator being tagged as CPU intensive, the Edge Match operator being tagged as memory intensive, the Cartesian Product operator being tagged as memory intensive, the Reachability Match operator being tagged as memory intensive, the Group By operator being tagged as CPU intensive, and the Order By operator being tagged as CPU intensive. The operator classifications 300 shown in FIG. 3 is not intended to include an exhaustive list of operators, conditions, and tags, but instead serves as an example of how computing resource requirements of graph operators may be classified in context of an embodiment.

At block 204, the server 102 receives one or more graph workloads from one or more of the clients 114, 116, 118. At block 206, the graph analytics engine 104 decomposes each received workload into corresponding series of graph operators that would be performed on a respective graph dataset to execute a respective workload.

At block 208, the graph analytics engine 104 determines resource requirements on the basis of the graph operators that constitute each graph workload. In one embodiment, the graph analytics engine 104 classifies or tags each operator by runtime resource utilization, for example, as memory intensive or CPU intensive. For instance, the graph analytics engine 104 locates each operator in the operator classifications 106, 300 and examines one or more result set estimators, if needed, to identify a corresponding runtime resource tag—memory intensive or CPU intensive.

If there are multiple different sets of operator classifications 106, 300, then at block 208, the graph analytics engine 104 identifies a closest match between characteristics of a graph dataset associated with a given graph workload request and characteristics of one or more underlying predetermined graph datasets used to generate a particular operator classification 106, 300. In this case, the graph analytics engine 104 determines resource requirements based on the closest matching operator classification.

At block 210, the graph analytics engine 104 determines weights for each operator based on runtime resource requirements. The determined weights are used subsequently to determine how computing resources, such as CPU threads, are allocated to execute an operator. In one embodiment, the determined weights are relative weights based on whether an operator is classified as being memory intensive or CPU intensive. In this embodiment, the graph analytics engine 104 assigns a higher relative weight to CPU intensive operators as compared to memory intensive operators. For instance, a CPU intensive operator may be assigned a weight of 2 W, which is two-times a weight W assigned to a memory intensive operator. These relative weights may be modified or adjusted if, for example, a number of on-line rebalancing iterations exceeds a predetermined threshold. In such a case, a relatively large number of rebalancing iterations may indicate that the relative weights can be increased or decreased to help improve a convergence rate associated with the on-line rebalancing processes.

In one embodiment, at block 210, the graph analytics engine 104 identifies groups of operators that may be performed at least in part concurrently and determines weights for operators on a per group basis. As a result, the graph analytics engine 104 is configured to more effectively allocate resources between concurrently executed operator jobs.

At block 212, the graph analytics engine 104 uses the determined weights to assign or allocate computing resources, such as CPU threads, to be used to execute the operators of each workload. In one embodiment, the graph analytics engine divides a number of CPU threads in a pool of available CPU threads by the cumulative, total weights assigned to the decomposed graph operators. This division provides a result that corresponds to the number of CPU threads allocated to operators associated with a weight W, and the number of CPU threads allocated to other operators can be determined by multiplying the result by an associated relative-weight multiplier. Thus, for example, a CPU intensive operator having a weight 2 W will be allocated two-times the CPU threads as a memory intensive operator having a weight W.

Illustratively, at block 204, the server 102 receives a first graph workload and a second graph workload from the one or more clients 114, 116, 118. At block 206, the graph analytics engine 104 decomposes the first graph workload into a Root Vertex Match operator and a Common Neighbor Match operator, and decomposes the second graph workload into a Neighbor Match operator and an Edge Match operator. At block 208, the graph analytics engine 104 references the operator classifications 106, 300 and characteristics of first and second graph datasets corresponding to the first and second graph workloads, respectively, to tag each of the decomposed operators as being memory intensive or CPU intensive.

In this example, at block 208, the graph analytics engine tags the Root Vertex Match operator as being memory intensive, the Common Neighbor Match operator as being CPU intensive, the Neighbor Match operator as being CPU intensive, and the Edge Match operator as being memory intensive. At block 210, the graph analytics engine 104 determines weights for each operator according to a predetermine rule, for instance, that a CPU intensive operator is given twice the weight as compared to a memory intensive operator. Accordingly, at block 210, the graph analytics engine 104 determines that the Root Vertex Match operator has a weight of W, the Common Neighbor Match operator has a weight of 2 W, the Neighbor Match operator has a weight of 2 W, and the Edge Match operator has a weight of W. According to this example, the cumulative, total weights assigned to the decomposed graph operators equals 6 W.

At block 212, the graph analytics engine 104 allocates CPU threads from the pool of CPU threads to each operator that may be executed concurrently. For example, given a pool that has twenty-four CPU threads, the graph analytics engine 104 determines that an operator with a weight W should be allocated four CPU threads (6 W=24; W=24/6=4). According to this example, the graph analytics engine 104 allocates four CPU threads for the Root Vertex Match operator, eight CPU threads for the Common Neighbor Match operator, eight CPU threads for the Neighbor Match operator, and four CPU threads for the Edge Match operator.

On-Line Analysis

Figure 4:
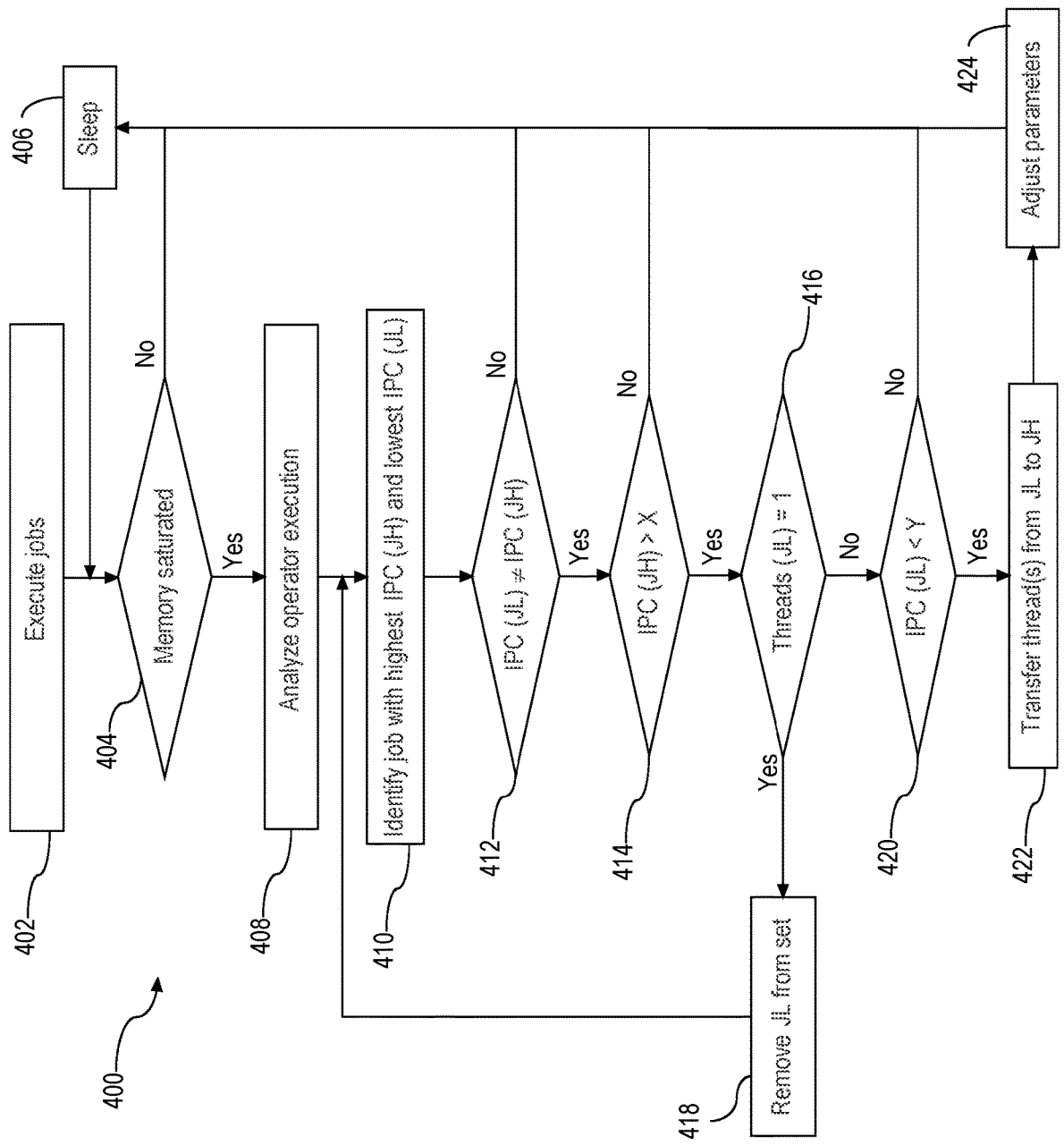
FIG. 4 is a flowchart depicting on-line graph workload analysis according to an embodiment.

FIG. 4 is a flowchart depicting on-line graph workload analysis or rebalancing according to an embodiment. In practice, the off-line graph workload analysis of FIG. 2 is dependent on the specific input graph datasets, which likely differ from the set of one or more predetermined graph datasets used to determine the operator classifications 106, 300. As a result, the off-line graph workload analysis of FIG. 2 can result in misclassifications of resource requirements for constituent graph operators, which in turn can result in misallocations of computing resources to execute the operators. Misallocations of computing resources include, for instance, memory intensive jobs being allocated too many CPU threads and/or CPU intensive jobs being allocated too few CPU threads. The effect of such misclassifications and misallocations may be to reduce overall throughput of the system. The on-line graph workload rebalancing of FIG. 4 helps to address such misallocations at runtime by moving threads from memory intensive jobs to CPU intensive jobs, and thereby helps to improve throughput of the system.

At block 402, the graph analytics engine 104 instantiates each concurrently executed operator identified by the flowchart 200 of FIG. 2 as an operator job, and causes the allocated computing resource 108 to execute the jobs on one or more input graph datasets. At block 402 and/or at block 212, the server 102 may also enforce other workload requirements, such as synchronization, sequence, and/or timing of operator execution, operator or workload priority, minimum and/or maximum CPU thread requirements, and the like. During execution of the jobs, the graph analytics engine 104 uses hardware counters 120 to monitor CPU usage and memory usage of each individual operator job.

At block 404, the graph analytics engine 104 monitors the execution of the jobs to determine whether memory bandwidth has been saturated. If memory bandwidth has not been saturated, at block 406, the graph analytics engine 104 waits for a predetermined period, such as one second, before analyzing memory saturation again at block 404.

If memory bandwidth has been saturated, some CPU threads may have been assigned to jobs that under-utilize the threads because the jobs are memory bound. In this case, at block 408, the graph analytics engine 104 further analyzes job execution. In one embodiment, at block 408, the graph analytics engine 104 determines, for each concurrently executing job, the number of allocated CPU threads and the instructions per cycle (IPC). The graph analytics engine 104 may store this and other data from flowchart 400 for future reference.

At block 410, the graph analytics engine 104 identifies a job with the highest IPC (JH) and a job with the lowest IPC (JL). At block 412, the graph analytics engine 104 confirms that there is a distinct job JH and job JL, and that job JL and job JH have different IPC values. If not, the flowchart 400 returns to block 406.

If there is a distinct job JH and job JL, at block 414, the graph analytics engine 104 determines whether job JH with the highest IPC has an associated IPC that is greater than a threshold X. For example, the threshold X may be set at 1. If the IPC of job JH is less than the threshold, then this may indicate that job JH is not necessarily limited by CPU resource, and that additional CPU resources may not be efficiently utilized. In this case, the flowchart 400 returns to block 406.

If the IPC of job JH is higher than the threshold, then this may indicate that job JH is limited by CPU resources and could benefit from additional available CPU resources. In this case, at block 416, the graph analytics engine 104 analyzes the number of CPU threads allocated to job JL with the lowest IPC. If job JL is allocated only one CPU thread, then rebalancing of computing resources from job JL to job JH is not productive. In this case, at block 418, the graph analytics engine 104 removes job JL from consideration and, at block 410, identifies for further iteration through blocks 412, 414, a job with the next lowest IPC.

If job JL is allocated more than one CPU thread, at block 420, the graph analytics engine 104 determines whether job JL with the lowest IPC has an associated IPC that is less than a threshold Y. For example, the threshold Y may be set at 0.2. If the IPC of job JL is greater than the threshold, then this may indicate that job JL has not been allocated CPU resources that are being underutilized at runtime. Consequently, reallocating one or more CPU threads from job JL to job JH may not be desirable.

However, if the IPC of job JL is less than the threshold, then this may indicate that job JL has been allocated CPU resources that are being underutilized at runtime. In this case, at block 422, the graph analytics engine 104 rebalances or reallocates one or more CPU threads from job JL to job JH. In one embodiment, at block 422, the graph analytics engine 104 transfers one CPU thread from job JL to job JH.

In the present example of FIG. 4, an additional block 424 is provided so that the graph analytics engine 104 can adjust parameters as needed or desired. For instance, the graph analytics engine 104 may modify or adjust the number of CPU threads that are transferred from job JL to job JH if, for example, a number of on-line rebalancing iterations exceeds a predetermined threshold. In such a case, a relatively large number of rebalancing iterations may indicate that more than one CPU thread should be transferred from job JL to job JH at block 422 to help improve a convergence rate associated with the on-line rebalancing processes. In other words, the number of CPU threads reallocated may be increased or decreased so that fewer iterations of flowchart 400 that result in transfers or reallocations of threads from job JL to job JH are needed. For instance, instead of one CPU thread being transferred from job JL to JH, future iterations may transfer two CPU threads from job JL to JH.

Further, at block 424, the graph analytics engine 104 can adjust the initial weights (discussed above) so that fewer iterations of flowchart 400 that result in transfers or reallocations of threads from job JL to job JH are needed. For instance, a CPU intensive operator may be assigned a weight of 3 W, which is three-times a weight W assigned to a memory intensive operator. Adjusting the initial relative weights in this manner may provide more accurate computing resources allocations when subsequent graph workloads are received.

At block 424, the graph analytics engine 104 may also modify the operator classifications 106, 300 to better match runtime computing resource usage. For instance, according to FIG. 3, the Edge Match operator is tagged as always being memory intensive, but when monitoring execution of the Edge Match operator for a particular input graph dataset and graph workload, the graph analytics engine 104 may determine that the resource usage is actually CPU intensive in that particular case. In response to this determination, the graph analytics engine 104 can modify or provide additional operator classifications based on characteristics of the particular input graph dataset and/or graph workload. In one variation of flowchart 400, adjustments according to block 424 may be performed in conjunction with the analysis or monitoring of block 408. Other variations of the flowchart 400 and the flowchart 200 are also possible in other contemplated embodiments.

According to the embodiment of flowchart 400, after block 424, the graph analytics engine 104 may reiterate through the flowchart 400 to perform further rebalancing.

Method Overview

Flowcharts 200 of FIGS. 2 and 400 of FIG. 4 include operations, functions, and/or actions as represented by the illustrated blocks. For purposes of illustrating a clear example, the flowcharts are described with reference to execution using certain elements disclosed herein, such as the system 100 of FIG. 1. However, FIG. 2 and FIG. 4 may be implemented in other embodiments using computing devices, programs, or other computing elements different than those of FIG. 1. Further, although the blocks are illustrated in a particular order, the blocks may also be performed in parallel, and/or in a different order than described herein. Methods 200 and 400 may also include additional or fewer blocks, as needed or desired. For example, the blocks can be combined into fewer blocks, divided into additional blocks, and/or removed based upon a desired implementation.

FIG. 2 and FIG. 4 may be implemented using one or more computer programs or other software elements organized as sequences of instructions stored on computer-readable storage media. Each flow diagram or other process description in this disclosure, is described at the same level of detail as ordinarily used by persons of skill in the computing arts to communicate among one another about the functional steps to be realized in computer programs that may include far more methods, objects, subroutines, or instructions than specifically indicated in FIG. 2 and FIG. 4. The development, deployment, testing, and debugging of functional programs is deemed to be within the high level of skill in the art to which this disclosure pertains.

In addition, each block may represent a module, a segment, or a portion of program code that includes one or more instructions executable by a processor for implementing specific logical functions or operations. The program code may be stored on any type of computer-readable medium or storage device including a disk or hard drive, for example. The computer-readable medium may include a non-transitory computer-readable medium, such as computer-readable media that stores data for short periods of time like register memory, processor cache, and Random Access Memory (RAM). The computer-readable medium may also include non-transitory media, such as secondary or persistent long-term storage, like read only memory (ROM), optical or magnetic disks, compact-disc read only memory (CD-ROM), etc. The computer-readable medium may also include any other volatile or non-volatile storage systems. The computer-readable medium may be considered a computer-readable storage medium, for example, or a tangible storage device. In addition, one or more of the blocks may represent circuitry that is configured to perform the logical functions and operations of the methods.

Software Overview

Figure 5:
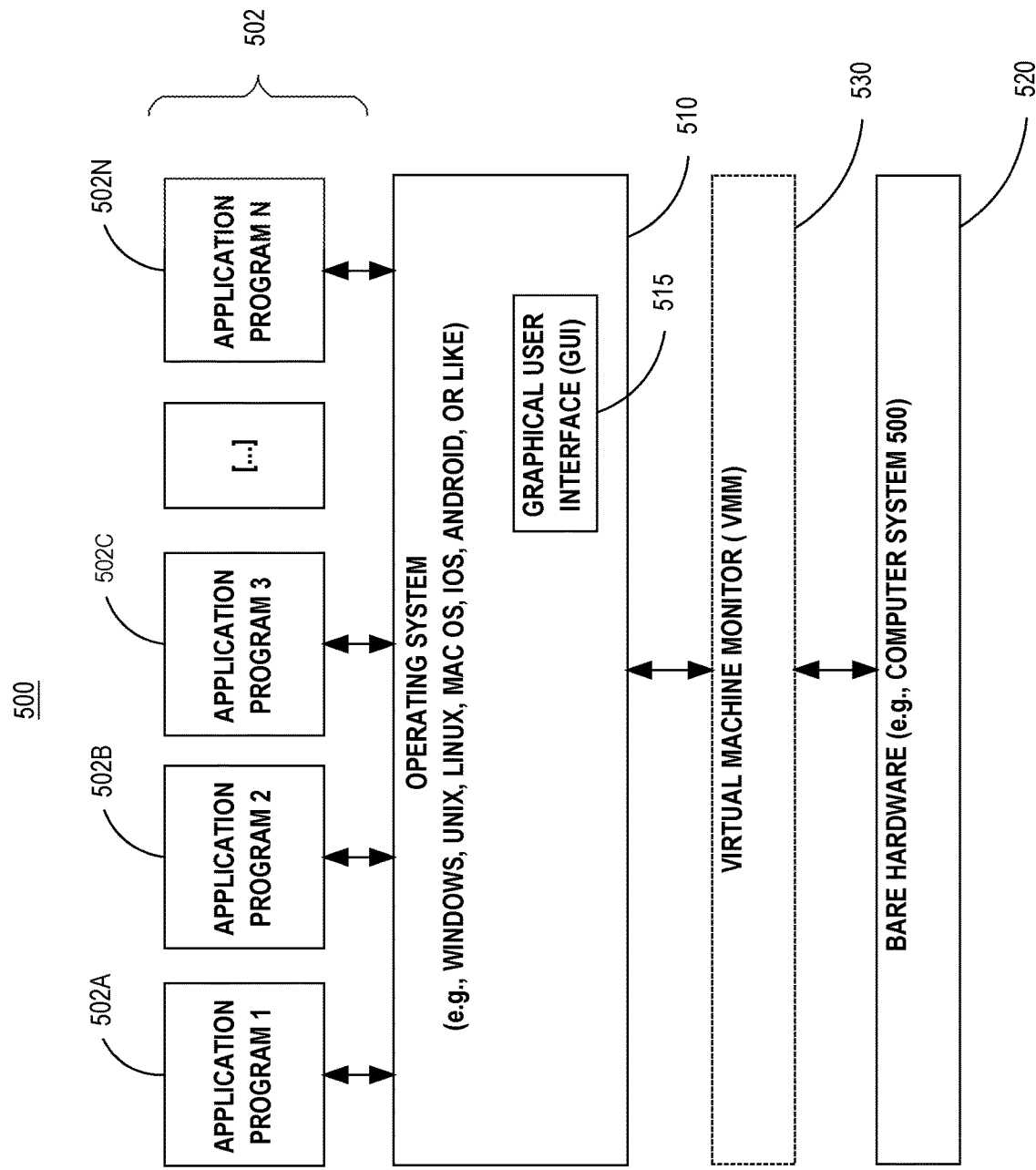
FIG. 5 is a diagram depicting a software system that can be used to implement one or more features of embodiments disclosed herein.
Figure 6:
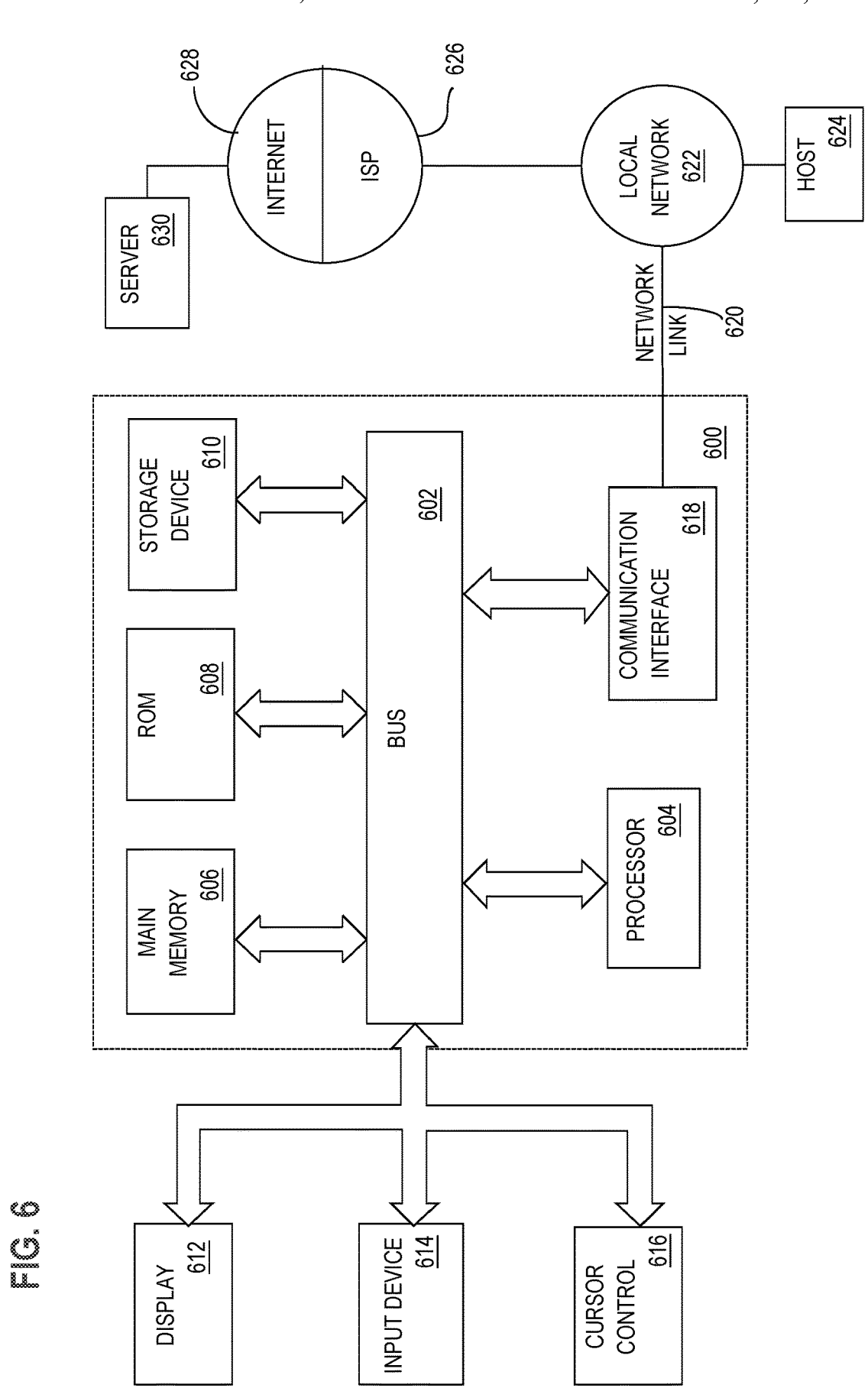
FIG. 6 is a diagram depicting a computer system that can be used to implement one or more features of embodiments disclosed herein.

FIG. 5 is a block diagram of a basic software system 500 that may be employed for controlling the operation of computing system 600 of FIG. 6. Software system 500 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 500 is provided for directing the operation of computing system 600. Software system 500, which may be stored in system memory (RAM) 606 and on fixed storage (e.g., hard disk or flash memory) 610, includes a kernel or operating system (OS) 510.

The OS 510 manages low-level aspects of computer operation, including managing execution of processes, memory allocation, file input and output (I/O), and device I/O. One or more application programs, represented as 502A, 502B, 502C . . . 402N, may be "loaded" (e.g., transferred from fixed storage 610 into memory 606) for execution by the system 500. The applications or other software intended for use on computer system 600 may also be stored as a set of downloadable computer-executable instructions, for example, for downloading and installation from an Internet location (e.g., a Web server, an app store, or other online service).

Software system 500 includes a graphical user interface (GUI) 515, for receiving user commands and data in a graphical (e.g., "point-and-click" or "touch gesture") fashion. These inputs, in turn, may be acted upon by the system 500 in accordance with instructions from operating system 510 and/or application(s) 502. The GUI 515 also serves to display the results of operation from the OS 510 and application(s) 502, whereupon the user may supply additional inputs or terminate the session (e.g., log off).

OS 510 can execute directly on the bare hardware 520 (e.g., processor(s) 604) of computer system 600. Alternatively, a hypervisor or virtual machine monitor (VMM) 530 may be interposed between the bare hardware 520 and the OS 510. In this configuration, VMM 530 acts as a software "cushion" or virtualization layer between the OS 510 and the bare hardware 520 of the computer system 600.

VMM 530 instantiates and runs one or more virtual machine instances ("guest machines"). Each guest machine comprises a "guest" operating system, such as OS 510, and one or more applications, such as application(s) 502, designed to execute on the guest operating system. The VMM 530 presents the guest operating systems with a virtual operating platform and manages the execution of the guest operating systems.

In some instances, the VMM 530 may allow a guest operating system to run as if it is running on the bare hardware 520 of computer system 600 directly. In these instances, the same version of the guest operating system configured to execute on the bare hardware 520 directly may also execute on VMM 530 without modification or reconfiguration. In other words, VMM 530 may provide full hardware and CPU virtualization to a guest operating system in some instances.

In other instances, a guest operating system may be specially designed or configured to execute on VMM 530 for efficiency. In these instances, the guest operating system is "aware" that it executes on a virtual machine monitor. In other words, VMM 530 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 6 is a block diagram that illustrates a computer system 600 upon which an embodiment of the disclosure may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk or optical disk, is provided and coupled to bus 402 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

In the foregoing specification, embodiments of the disclosure have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprise two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

The above-described basic computer hardware and software and cloud computing environment presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

What is claimed is:

1. A method comprising:
receiving a request to execute a graph processing workload on a dataset, wherein the dataset is modeled as a graph;
identifying a plurality of graph operators that constitute the graph processing workload;
determining that execution of each graph operator of the plurality of graph operators is either processor intensive or memory intensive;
assigning a task weight to each graph operator of the plurality of graph operators based on the determining;
performing, based on the task weights assigned to the plurality of graph operators, a first allocation of computing resources to execute the plurality of graph operators;
causing, according to the first allocation, execution of the plurality of graph operators by the computing resources;
monitoring computing resource usage of the plurality of graph operators executed by the computing resources according to the first allocation;
performing, responsive to monitoring the computing resource usage, a second allocation of computing resources to execute the plurality of graph operators, wherein the second allocation is different than the first allocation; and
causing, according to the second allocation instead of according to the first allocation, execution of the plurality of graph operators by the computing resources.

2. The method of claim 1, wherein performing the second allocation of computing resources to execute the plurality of graph operators further comprises:
identifying, for each graph operator of the plurality of graph operators, an instructions per cycle (IPC) metric for execution of the plurality of graph operators according to the first allocation;
identifying a first graph operator of the plurality of graph operators with a first IPC corresponding to a highest IPC, and a second graph operator of the plurality of graph operators with a second IPC corresponding to a lowest IPC; and
assigning at least one computing resource from the second graph operator to the first graph operator.

3. The method of claim 2, further comprising:
adjusting, responsive to performing the second allocation, one or more task weights relative to whether execution of a given graph operator is processor intensive or memory intensive, or a number of computing resources assigned, during subsequent iterations of performing other allocations of computing resources to execute the plurality of graph operators, from a graph operator with a lowest IPC to a graph operator with a highest IPC.

4. The method of claim 1, wherein performing the second allocation of computing resources to execute the plurality of graph operators further comprises:
identifying, for each graph operator of the plurality of graph operators, an instructions per cycle (IPC) metric for execution of the plurality of graph operators according to the first allocation;
identifying a first graph operator of the plurality of graph operators with a first IPC corresponding to a highest IPC, and a second graph operator of the plurality of graph operators with a second IPC corresponding to a lowest IPC;
determining that the first IPC of the first graph operator is greater than a first threshold value;
determining that the second IPC of the second graph operator is less than a second threshold value; and
responsive to determining that the first IPC of the first graph operator is greater than the first threshold value and that the second IPC of the second graph operator is less than the second threshold value, assigning at least one computing resource from the second graph operator to the first graph operator.

5. The method of claim 4, further comprising:
monitoring computing resource usage of graph operators executed by the computing resources according to the second allocation;
performing, responsive to monitoring computing resource usage, a third allocation of computing resources to execute the plurality of graph operators; and
causing, according to the third allocation instead of according to the second allocation, execution of the plurality of graph operators by the computing resources.

6. The method of claim 5, wherein performing the third allocation of computing resources to execute the plurality of graph operators further comprises:
identifying, for each graph operator of the plurality of graph operators, an instructions per cycle (IPC) metric for execution of the plurality of graph operators according to the second allocation;
identifying a third graph operator of the plurality of graph operators with a third IPC corresponding to a highest IPC, and a fourth graph operator of the plurality of graph operators with a fourth IPC corresponding to a lowest IPC;

determining that the third IPC of the third graph operator is greater than the first threshold value;

determining that the fourth IPC of the fourth graph operator is less than the second threshold value; and responsive to determining that the third IPC of the third graph operator is greater than the first threshold value and that the fourth IPC of the fourth graph operator is less than the second threshold value, assigning at least one computing resource from the fourth graph operator to the third graph operator.

7. The method of claim 1, wherein the first allocation and the second allocation allocate one or more CPU threads from a plurality of CPU threads to execute each graph operator of the plurality of graph operators.

8. The method of claim 1, further comprising:

processing one or more predetermined graph datasets to assign resource usage classifications to a set of one or more graph operators, wherein each of the one or more predetermined graph datasets is modeled as a graph, and wherein the resource usage classifications identify that execution of a given graph operator on the one or more predetermined graph datasets is either processor intensive or memory intensive; and wherein the determining that execution of each graph operator of the plurality of graph operators is either processor intensive or memory intensive is performed by utilizing the resource usage classifications assigned to the set of one or more graph operators.

9. The method of claim 8, further comprising:

adjusting, responsive to monitoring the computing resource usage of graph operators executed by the computing resources according to the first allocation, the resource usage classifications assigned to the set of one or more graph operators.

10. The method of claim 1, wherein the first allocation allocates one or more CPU threads from a plurality of CPU threads to execute each graph operator of the plurality of operators; and wherein performing the first allocation of computing resources to execute the plurality of graph operators further includes calculating a result by dividing a total number of CPU threads in the plurality of CPU threads by a cumulative task weight assigned to the plurality of graph operators, and multiplying the result by the assigned task weight for each graph operator.

11. One or more non-transitory computer-readable storage medium storing instructions that, when executed by one or more processors, cause the one or more processors to perform functions comprising:

receiving a request to execute a graph processing workload on a dataset, wherein the dataset is modeled as a graph;

identifying a plurality of graph operators that constitute the graph processing workload;

determining that execution of each graph operator of the plurality of graph operators is either processor intensive or memory intensive;

assigning a task weight to each graph operator of the plurality of graph operators based on the determining;

performing, based on the task weights assigned to the plurality of graph operators, a first allocation of computing resources to execute the plurality of graph operators;

causing, according to the first allocation, execution of the plurality of graph operators by the computing resources;

monitoring computing resource usage of the plurality of graph operators executed by the computing resources according to the first allocation;

performing, responsive to monitoring the computing resource usage, a second allocation of computing resources to execute the plurality of graph operators, wherein the second allocation is different than the first allocation; and causing, according to the second allocation instead of according to the first allocation, execution of the plurality of graph operators by the computing resources.

12. The one or more non-transitory computer-readable storage medium of claim 11, further comprising instructions that, when executed by one or more processors, cause the one or more processors to perform functions comprising:

performing the second allocation of computing resources to execute the plurality of graph operators by performing functions that further comprise:

identifying, for each graph operator of the plurality of graph operators, an instructions per cycle (IPC) metric for execution of the plurality of graph operators according to the first allocation;

identifying a first graph operator of the plurality of graph operators with a first IPC corresponding to a highest IPC, and a second graph operator of the plurality of graph operators with a second IPC corresponding to a lowest IPC; and assigning at least one computing resource from the second graph operator to the first graph operator.

13. The one or more non-transitory computer-readable storage medium of claim 12, further comprising instructions that, when executed by one or more processors, cause the one or more processors to perform functions comprising:

adjusting, responsive to performing the second allocation, one or more task weights relative to whether execution of a given graph operator is processor intensive or memory intensive, or a number of computing resources assigned, during subsequent iterations of performing other allocations of computing resources to execute the plurality of graph operators, from a graph operator with a lowest IPC to a graph operator with a highest IPC.

14. The one or more non-transitory computer-readable storage medium of claim 11, further comprising instructions that, when executed by one or more processors, cause the one or more processors to perform functions comprising:

performing the second allocation of computing resources to execute the plurality of graph operators by performing functions that further comprise:

identifying, for each graph operator of the plurality of graph operators, an instructions per cycle (IPC) metric for execution of the plurality of graph operators according to the first allocation;

identifying a first graph operator of the plurality of graph operators with a first IPC corresponding to a highest IPC, and a second graph operator of the plurality of graph operators with a second IPC corresponding to a lowest IPC;

determining that the first IPC of the first graph operator is greater than a first threshold value;

determining that the second IPC of the second graph operator is less than a second threshold value; and responsive to determining that the first IPC of the first graph operator is greater than the first threshold value and that the second IPC of the second graph operator is less than the second threshold value, assigning at least one computing resource from the second graph operator to the first graph operator.

15. The one or more non-transitory computer-readable storage medium of claim 14, further comprising instructions that, when executed by one or more processors, cause the one or more processors to perform functions comprising:
monitoring computing resource usage of graph operators executed by the computing resources according to the second allocation;
performing, responsive to monitoring computing resource usage, a third allocation of computing resources to execute the plurality of graph operators; and
causing, according to the third allocation instead of according to the second allocation, execution of the plurality of graph operators by the computing resources.

16. The one or more non-transitory computer-readable storage medium of claim 15, further comprising instructions that, when executed by one or more processors, cause the one or more processors to perform functions comprising:
performing the third allocation of computing resources to execute the plurality of graph operators by performing functions that further comprise:
identifying, for each graph operator of the plurality of graph operators, an instructions per cycle (IPC) metric for execution of the plurality of graph operators according to the second allocation;
identifying a third graph operator of the plurality of graph operators with a third IPC corresponding to a highest IPC, and a fourth graph operator of the plurality of graph operators with a fourth IPC corresponding to a lowest IPC;
determining that the third IPC of the third graph operator is greater than the first threshold value;
determining that the fourth IPC of the fourth graph operator is less than the second threshold value; and
responsive to determining that the third IPC of the third graph operator is greater than the first threshold value and that the fourth IPC of the fourth graph operator is less than the second threshold value, assigning at least one computing resource from the fourth graph operator to the third graph operator.

17. The one or more non-transitory computer-readable storage medium of claim 14, wherein the first allocation and the second allocation allocate one or more CPU threads from a plurality of CPU threads to execute each graph operator of the plurality of graph operators.

18. The one or more non-transitory computer-readable storage medium of claim 11, further comprising instructions that, when executed by one or more processors, cause the one or more processors to perform functions comprising:
processing one or more predetermined graph datasets to assign resource usage classifications to a set of one or more graph operators, wherein each of the one or more predetermined graph datasets is modeled as a graph, and wherein the resource usage classifications identify that execution of a given graph operator on the one or more predetermined graph datasets is either processor intensive or memory intensive; and
wherein the function of determining that execution of each graph operator of the plurality of graph operators is either processor intensive or memory intensive is further performed by utilizing the resource usage classifications assigned to the set of one or more graph operators.

19. The one or more non-transitory computer-readable storage medium of claim 18, further comprising instructions that, when executed by one or more processors, cause the one or more processors to perform functions comprising:
adjusting, responsive to monitoring the computing resource usage of graph operators executed by the computing resources according to the first allocation, the resource usage classifications assigned to the set of one or more graph operators.

20. The one or more non-transitory computer-readable storage medium of claim 11, wherein the first allocation allocates one or more CPU threads from a plurality of CPU threads to execute each graph operator of the plurality of graph operators; and
wherein the function of performing the first allocation of computing resources to execute the plurality of graph operators further includes the functions of calculating a result by dividing a total number of CPU threads in the plurality of CPU threads by a cumulative task weight assigned to the plurality of graph operators, and multiplying the result by the assigned task weight for each graph operator.

* * * * *